United States Patent Office 2,752,248
Patented June 26, 1956

2,752,248

PREPARATION OF EGG WHITE ADDITIVES

Philip Blick, Chicago, and Ervin W. Hopkins, Hinsdale, Ill., assignors to Armour and Company, Chicago, Ill., a corporation of Illinois No Drawing. Application May 6, 1952,
Serial No. 286,422

7 Claims. (Cl. 99—113)

This invention relates to egg white additives. More particularly, this invention relates to additive compositions for egg whites which improve the foaming properties of the egg whites, such as rate of foam formation, foam volume, and foam stability.

Large quantities of fresh, frozen, and reconstituted egg whites are used to prepare various food products. For most purposes, it is necessary to whip the egg whites into a light, fluffy foam before they are incorporated in the food products. For example, large quantities of whipped egg whites are used in making angelfood cakes, nougat cream, etc. The foaming properties of egg whites, relating both to the rapidity of foam formation and the volume of the foam, are therefore of considerable commercial importance. Also, the stability of the foam is a matter of importance. Egg whites vary considerably as to the time required to whip the egg whites, the resulting volume of the whipped whites, and the stability of the whipped product. Some egg whites can not be made to whip to any appreciable extent within reasonable whipping times. The explanation for this is not understood, nor are the factors or properties of egg whites which tend to produce rapid foam formation, and large volume of foam.

Additives have long been sought which would improve the foaming properties of egg whites, and particularly the properties indicated above, which tend to produce rapid foam formation, large foam volume, and foam stability. To be of practical importance, of course, additives for accomplishing these results must be edible, and also must not unduly interfere with the normal storage and use of egg whites. Heretofore, no satisfactory additives for egg whites conforming to these requirements have been known.

It is therefore a general object of this invention to provide additive compositions for egg whites which are capable of favorably influencing the foaming properties of egg whites, and thereby accomplishing one or more of the objectives set out above; namely, increasing the rate of foam formation, the volume of foam, or the stability of the foam. It is also a primary object of this invention to provide a method for producing additive compositions of the type indicated. Another object of this invention is to provide an improved egg white whipping composition including ordinary egg whites in combination with minor proportions of an additive composition capable of cooperating with the egg whites to improve the properties of the mixture. Further objects and advantages will become apparent as the specification proceeds.

In one of its phases, this invention is based on the discovery that a composition capable of improving the foaming properties of egg whites can be prepared from egg whites themselves by subjecting the whites to a mild alkali treatment. One surprising aspect of this discovery is that the alkali-treated egg whites are of little value when employed by themselves, their unexpected utility arising when they are used as an additive to ordinary, untreated egg whites. Further specific discoveries will subsequently be discussed in detail.

The starting material for preparing the additive compositions of this invention can be designated generally as egg whites. Either fresh, frozen, or reconstituted dried egg whites can be employed. However, fresh or frozen egg whites are preferred, since it is desirable to have the egg whites in liquid form for treatment with the alkaline agent.

In carrying out the method of this invention the egg whites are treated with an alkaline agent capable of bringing about gelation of the egg whites. The alkali metal hydroxides, and particularly sodium and potassium hydroxide, are the preferred treating agents. Excellent results are obtained by using sodium hydroxide. However, other alkaline agents which are well known equivalents of sodium and potassium hydroxide for producing mild alkaline conditions in aqueous solutions can be employed. For example, trisodium phosphate, sodium carbonate, etc., can be used.

Preferably, the alkaline agents are introduced into the egg whites in an aqueous solution, and a sufficient amount of the aqueous solution is added to bring about gelation of the egg whites at ordinary room temperatures (20 to 25° C.). When employing alkali metal hydroxides, such as sodium and potassium hydroxide, it has been found desirable to add at least .5% by weight of the hydroxide to the liquid egg whites. Concentrations of between about 1 to 3% by weight of the alkali metal hydroxide are particularly desirable, and excellent results are obtained when employing concentrations of around 2% by weight. Higher concentrations up to at least 5% by weight may be employed if desired, but there does not appear to be any particular advantage in employing higher concentrations, and in particular concentrations above 5%.

The temperature of the liquid egg whites at the time of the addition of the alkaline agent is not particularly critical. If desired, the addition can be made at ordinary room temperatures (20 to 25° C.). Temperatures from 0 to 60° C. can be employed, but it is desirable to keep the temperatures of the egg whites below about 50° C. to prevent extensive hydrolysis.

No particular technique is required for adding the egg whites other than that usually employed for making such additions. For example, the aqueous solution should be added slowly, and preferably with stirring of the egg whites to mix the alkaline agent therewith. A thorough and rapid stirring is necessary to prevent formation of lumps where the local concentration of alkali is high. A gel generally begins to form immediately upon the addition of the alkaline agent, and the egg whites set to a solid, rubbery condition in a few minutes. It is not known whether gelation of the egg whites is essential to accomplish the results of the present process, or whether the gelation is merely a physical concomitant of the desired chemical, or physical-chemical modification of the egg whites. However, it is believed that the rapid gelation of the whites on the addition of the alkaline agent tends to inhibit hydrolysis of the protein constituents. Since it is not desired to appreciably hydrolyze the proteins in the egg whites during the alkaline treatment, the production of the gel state is a convenient method of carrying out the treatment. It permits carrying out the treatment at somewhat greater concentrations of the alkaline agents than would otherwise be possible, and also longer contact times can be employed.

The next step in the process is ordinarily the liquefaction of the gel. This may be accomplished either by allowing the egg whites to undergo self-liquefaction or by promoting the liquefaction of the egg whites with heat. The firmness of stiffness of the gel, and indirectly the relative ease of liquefaction, can be controlled in various ways. For example, additional water can be added to the egg whites to prevent the gel from being too firm, and thereby more difficult to handle. At low concentrations of the alkaline agent, say around .7% by weight, it is necessary to heat the gelled egg whites to bring about liquefaction within any reasonable period of time for a commercial process. At higher concentrations of the alkaline agent, say around 2% by weight, spontaneous liquefaction of the gelled egg whites will occur at ordinary room temperatures. For example, at temperatures of between about 70 to 75° F., gelled egg whites containing 2% sodium hydroxide will spontaneously liquefy in from 24 to 36 hours. However, to speed up the liquefaction process at all concentrations of the alkaline agents, it is highly desirable to heat the gelled egg whites somewhat above room temperature. In general, heating temperatures of between about 30 to 50° C. are preferable. However, temperatures up to 60° C. can be employed, although the results are not as desirable as when the temperature is kept below 50° C. The alkali-treated egg whites are considerably more resistant to heat coagulation than untreated agg whites, and therefore it is possible to employ temperatures somewhat above the normal heat coagulation temperatures of egg whites. However, the use of high temperatures tends to cause the egg whites to develop a red-brown color, which is believed to be due to a reaction between the reducing sugars present in the egg whites and the alkaline agent during the heating period. The reducing sugars can be removed by exhaustive fermentation of the egg whites with microorganisms, but this additional step is not necessary when the lower temperatures are used as preferred. Furthermore, the liquefaction of the gel is promoted by employing concentrations of sodium or potassium hydroxide within the indicated preferred range of from 1 to 3% by weight.

Upon completion of the liquefaction of the gelled egg whites, it is highly desirable to neutralize the treated whites, or more specifically to restore the treated whites to the normal pH of egg whites. The normal pH of egg whites varies somewhat, but it is usually within the range from about pH 7.5 to 8.5. In some cases, the pH of egg whites may be as high as pH 9.0, but this is rather unusual. pH adjustment of the egg whites should be made with an edible acid, such as hydrochloric, tartaric, citric, etc. An aqueous solution of hydrochloric acid is preferred. The amount of acid to be added to bring the treated egg whites within the desired range can be easily determined by standard titration procedures.

The neutralized, treated egg whites can then be used directly as an additive to improve the whipping properties of untreated egg whites. For example, the alkali-treated whites in liquid form can be added to fresh egg whites or thawed frozen egg whites. The resulting composition can then be used immediately, or preserved by drying or freezing according to the usual procedures. If desired, the liquid alkali-treated egg whites can be dried before addition to untreated egg whites. Any suitable drying procedure can be employed, such as spray drying, pan drying, etc. As indicated above, the tolerance of the alkali-treated egg whites to heat is greater than ordinary egg whites, and therefore the drying temperature are not especially critical.

The amount of the alkali-treated egg whites to be added to untreated egg whites will vary somewhat depending upon the results desired to be accomplished. In general, it is desirable only to employ minor proportions of the alkali-treated egg whites in admixture with major proportions of untreated egg whites. More specifically, a desirable enhancement of the properties of egg whites can be obtained by forming a mixture of alkali-treated egg whites and untreated egg whites containing from about 1 to 10% by weight of the alkali-treated egg whites. For specific purposes, more limited proportions may be desirable. For example, when the egg whites are to be used to prepare meringue, it has been found desirable to incorporate from 5 to 10% by weight of the alkali-treated egg whites in the mixture. For preparing an egg white composition to be used in making angelfood cake, it has been found that the composition should contain between about 1 to 5% by weight of the alkali-treated whites.

While the above steps result in a highly desirable product which has great utility as an additive to egg whites, it has been found desirable to employ additional steps which still further improve the quality of the product. One of these additional steps involves the treatment of the egg whites to render them substantially free of hydrogen sulfide. The chemical reaction that ensues during the alkaline treatment of the egg whites is detectable by the odor of ammonia gas which is evolved during the course of the reaction. A slight odor of hydrogen sulfide is also detectable, which becomes much more noticeable upon adjusting the pH of the egg whites to their normal pH range upon the completion of the alkaline treatment. Apparently sulfhydryl bonds are broken during the course of the reaction, and some hydrogen sulfide is formed. Upon neutralization of the liquefied egg whites, a considerable amount of hydrogen sulfide is produced, and the odor is readily detectable. Since the presence of hydrogen sulfide in a food product is undesirable, it is preferred to treat the egg whites to either remove or prevent the formation of the hydrogen sulfide so that the finished product is substantially free of hydrogen sulfide. This can be done most conveniently by treating the liquefied egg whites either before or after neutralization with an oxidizing agent capable of destroying hydrogen sulfide, sulfhydryl groups, etc. by oxidation. Hydrogen peroxide is preferred for this purpose, because it decomposes into oxygen and water. However, other edible oxidizing agents can be employed, and in particular peroxide oxidizing agents, such as barium peroxide, sodium peroxide, and organic oxides such as acetyl peroxide and benzoyl peroxide. A sufficient amount of the peroxide treating agent should be employed to prevent the odor of hydrogen sulfide from being noticeable in the neutralized egg whites. When employing hydrogen peroxide, as preferred, concentrations of around .1 to 3% by weight of the hydrogen peroxide in the egg whites are satisfactory, and excellent results are obtained at concentrations between about .1 to .5%. Hydrogen peroxide can be added in the aqueous solution, such as, for example, a 5% commercial aqueous solution of hydrogen peroxide. Although the oxidizing agent can be added either before or after neutralization of the egg whites, it is preferred to add it before neutralization so as to prevent the development of a noticeable hydrogen sulfide odor.

A further step which is desirable in the production of a high quality product is the homogenization of the liquid egg whites to assure that all of the protein constituents are in suspension. Upon addition of the acidifying agent in the neutralization step, following the liquefaction of the gelled egg whites, flock formation is observable as the acid is added; and, even though the mixture is continually stirred during the addition of the acid, upon the completion of the addition, there will generally be some insoluble protein precipitate present. This insoluble precipitate tends to give the egg whites a cloudy appearance, and therefore it is desirable that the precipitate be either resuspended or removed. It can be removed by filtration, but it has been found preferable to merely pass the egg whites through a homogenizer, which results in the breaking up and resuspension of the precipitate. Also, of course, the liquid alkali-treated egg whites can be added to ordinary liquid egg whites, and the whole mixture homogenized.

The chemical nature of the product produced by the process described above and characterized by its utility as an egg white additive has not been completely determined. However, it is believed to be a composition in which an alkali metal is chemically associated with the egg white proteins. In particular, it is believed that the preferred product can be described as a sodium or potassium egg white proteinate. The egg white additives produced in accordance with this invention are also characterized by being alkali-treated egg whites in which the protein is substantially unhydrolyzed as compared to its original form. For example, analytical tests indicate that the increase in free amino groups during the alkaline treatment is negligible. In other words, severe alkaline hydrolysis of the egg white proteins is not essential to producing the product of the present invention; and, in fact, it is believed to be highly desirable to minimize the increase in free amino groups. More specifically, it is believed that the maximum increase in free amino groups should not exceed 10 mg. amino nitrogen per gm. of egg white solids, and preferably not more than 5 mg. amino nitrogen per gm. egg white solids.

For the purpose of more fully illustrating the present invention it is desired to set out the following examples.

Example I

To 30 g. of defrosted frozen egg white, 0.6 g. of NaOH dissolved in a minimum of water was added with stirring. A stiff gel formed at once, but became liquefied after four days. The alkaline egg white was adjusted to pH 8.3 with HCl, homogenized, and 10 per cent by volume added to fresh egg white. Whipping tests of the egg white under constant conditions gave the following results:

|  | Height of foam, in. | Drip from 75 g. foam, 1 hr., ml. |
| --- | --- | --- |
| Egg white control | 2⅝ | 26.5 |
| Egg white+10% alkali-treated white | 3⅝ | 18.0 |

A whipping test was done in the same manner with another preparation of egg white treated with NaOH, and then added at the level of 5% to fresh egg white.

|  | Height of foam, in. | Drip from 75 g. foam, 1 hr., ml. |
| --- | --- | --- |
| Egg white control | 2¼ | 21 |
| Egg white+5% alkali-treated white | 3 | 23 |

In either the 5 or 10% addition cases, a greater volume of foam was obtained, and while the foam stability appears to be increased by 10%, 5% of alkali-treated white was not effective.

Example II

The action of egg white prepared in the manner described in Example I was tested in making angel food cakes. Egg white is whipped at a high speed until considerable foaming occurs, cream of tartar, salt, and one half of the required sugar are added. Whipping them proceeds until the whites have a dull appearance and the flour and remaining sugar are then folded in gently. It was found that egg white of normal whipping characteristics containing more than 2 or 3% of the alkali-treated whites gave angel food cake batters of large volume, but poor stability. While baking, these batters collapsed to a considerable extent, and cakes with coarse texture were the result. When 2 or 3% of the egg white preparation was contained in the batter, the maximum foam volume developed in shorter than normal time, and cakes with texture of the desired fineness were obtained. A test with egg whites having very poor whipping qualities shows that some cases may require higher percentages of the treated white than 2 to 3%, as follows:

Egg white control—whites whipped for 20 minutes with little or no foaming.

Egg white +5% alkali-treated white—whipping completed in 18 minutes.

In this case a cake of normal texture and volume was made from egg white which would not whip at all within practical limits of whipping time. Even after the alkali-treated white was added, the time required to obtain the required foam valume was about twice that normally experienced, but the addition made it possible to use the egg whites.

Example III

The required quantity of sodium hydroxide to make a 2% concentration in 87.5 lbs. of egg white was dissolved in water, and added gradually with stirring to the egg white. A rubbery gel formed in a few minutes. This was held at a temperature of 70 to 75° F. overnight, and by morning, most of the gel had liquefied. Remaining parts of the gel were broken up mechanically, and when heated to 30 to 35° F. were liquefied after about 3 hours. Hydrochloric acid was added until a pH of 8.5 was reached, and the precipitated protein was resuspended by means of a colloid mill. The egg white was dried in a laboratory spray drier. This preparation when reconstituted to the normal solids content of egg white (10%) and 3% of the solution added to slow-whipping egg white reduced whipping time from 18 to 10 minutes.

Example IV

Baking tests had shown that the addition of 2 or 3% of alkali-treated egg white to either fresh or thawed frozen whites decreased the whipping time of angel food cake batters. An important question was whether the alkali-treated white could be mixed into egg white just before freezing and still retain through a period of storage extending over several months the effect on foaming which was observed in fresh whites.

Well-mixed fresh egg white was divided into two portions, and from one 5 1100 g. amounts were weighed into tin containers. To the other portion, 3% of alkali-treated white was added and mixed in, and this also divided into 5 1100 g. amounts. Four of the containers from the two sets were placed in a freezer, and a pair was removed at intervals up to 4½ mo. for use in making angel food cakes. Storage temperature was 0 to 10° F., the results were as follows:

BATTER WHIPPING TIMES

| Time of storage | Egg white control, min. | Treaded white,[1] min. |
| --- | --- | --- |
| None, not frozen | 13 | 5 |
| 17 days | 13 | 7 |
| 1 mo | 12 | 8 |
| 3½ mo | 13½ | 9 |
| 4½ mo | 9 | 6 |

[1] Egg white+3% of alkali-treated white.

Observations on volume and texture of the cakes indicated that all were satisfactory. The results show that the effect on whipping times of the small addition of alkali-treated white at the time of freezing is retained for at least 4½ months.

Example V

In the above axamples, the odor of hydrogen sulfide became apparent when the egg white was neutralized after liquefaction of the alkali gel had occurred. At a 2 or 3% dilution of the alkali-treated egg white in normal egg white, there was little or no hydrogen sulfide detectable, but the possibility of even small amounts being present is undesirable. Oxidation of hydrogen sulfide by low concentration of hydrogen peroxide was accomplished as follows:

To 75 ml. of liquefied alkali-treated egg whilte, 5 ml. of 5% hydrogen peroxide were added. This gave a concentration of 0.31% hydrogen peroxide. After 15 minutes, the egg white was acidified to a pH of 2.5, but no hydrogen sulfide could be detected. Lower concentrations of hydrogen peroxide, such as 0.21% may also be used, but a longer time is required for complete reaction. In this latter case, residual hydrogen sulfide was apparent on acidifying after 15 minutes, but not after 20 minutes.

*Example VI*

For the purpose of determining the extent of hydrolysis of the egg white proteins under the conditions employed to prepare the egg white additives of the present invention, the following tests were conducted:

To the 10 g. of fresh egg white, 0.5 ml. of 40% by volume NaOH was added with agitation. This addition gives a 2% concentration of alkali in the egg white. Part of the flasks were incubated at 4-5° C., and part of 37° C. For titration, 90 ml. of distilled water were added. When any lumps of gelled white were present these were broken up, the solution let stand for 1 hour, and the lumps strained out. Dilute acid was added to the phenalphthalein end-point, neutral formaldehyde added, and the solution back-titrated with NaOH.

The titrating solution was 0.238 N. For comparative purposes, it was calculated to 0.2 N basis. A solids content of 12.2% was used in calculating the results to the ml. of 1% solution.

Converting the results to amino-N equivalency (1 ml. 0.2 N alkali=2.8 mg. amino-N), the following table was constructed.

|  | ml. 0.2 N NaOH per cc. | 0.2 N NaOH/g. egg white, ml. | amino nitrogen/g. egg white, mg. |
|---|---|---|---|
| Control egg white | 0.014 | .170 | 4.76 |
| 4-5° C.: |  |  |  |
| 5 days | .0200 | .244 | 6.83 |
| 9 days | .0205 | .250 | 7.00 |
| 37° C.: |  |  |  |
| 4 hour | .0156 | .190 | 5.32 |
| 24 hour | .0174 | .212 | 5.94 |

Corresponding analytical results on dried egg white preparations were as follows:

Ml. 0.2 N NaOH per cc.
Lyophilized fresh egg white _____ .0095
Spray dried egg whit _____ .0107
Alkali-treated white, pan dried _____ .0048
Alkali-treated white, spray dried _____ .0080

These figures differ by amounts within the experimental error, and are all somewhat lower than the value found for fresh egg white.

While in the foregoing specification specific embodiments of the present invention have been set out in considerable detail for purpose of illustration, it will be apparent to those skilled in the art that many of the details set forth can be varied widely without departing from the spirit of the invention.

We claim:
1. The process for preparing an egg white additive, which comprises treating liquid egg whites with between about 1 to 3% by weight of sodium hydroxide to bring about the gelation of said egg whites, liquefying the gel thus obtained by heating it at a temperature between 30 to 50° C., and adding a sufficient amount of an edible acid to the liquefied product to restore it to about the normal pH of egg whites.

2. The process for preparing an egg white additive, which comprises treating liquid egg whites with at least .5% by weight of an alkaline agent selected from the group consisting of sodium hydroxide and potassium hydroxide to bring about the gelation of said egg whites, liquefying the gel thus formed by heating said gel, adding an acid to the liquefied product to restore it to about the normal pH of egg whites, and also treating said product with a peroxide oxidizing agent to render it substantially free of hydrogen sulfide.

3. The process steps of claim 2 in which said peroxide oxidizing agent is hydrogen peroxide.

4. The process for preparing an egg white additive, which comprises treating liquid egg whites with between about 1 to 3% by weight of sodium hydroxide to bring about the gelation of said egg whites, liquefying the gel thus obtained by heating said gel at a temperature ranging from 30 to 50° C., treating the liquefied product with hydrogen peroxide to free it of undesirable odors, also adjusting the pH of the liquefied product to about the normal pH of egg whites, and homogenizing the liquefied product.

5. The process for preparing an egg white additive, characterized by the steps of gelling egg whites under alkaline pH conditions without hydrolyzing said egg whites by treating said egg whites with at least .5% by weight of an alkaline agent selected from the group consisting of alkali metal hydroxides and basic alkali metal salts, liquefying the gel thus obtained by holding said gel at a liquefaction-promoting temperature, and restoring the liquefied product to around the normal pH of egg whites.

6. The process for preparing an egg white additive, characterized by the steps of gelling egg whites under alkaline pH conditions without hydrolyzing said egg whites by treating said egg whites with at least .5% by weight of an alkali metal hydroxide, liquefying the gel thus obtained by heating said gel, and acidifying the liquefied product to restore said product to around the normal pH of egg whites.

7. The process steps of claim 6 in which said alkali metal hydroxide is employed in a concentration of between about 1 to 3% by weight.

References Cited in the file of this patent

UNITED STATES PATENTS

| 1,818,215 | Epstein et al. | Aug. 11, 1931 |
| 1,996,801 | Fischer | Apr. 9, 1935 |
| 2,059,399 | Rosner | Nov. 3, 1936 |
| 2,212,445 | Littlefield | Aug. 20, 1940 |
| 2,241,927 | Sahyun | May 13, 1941 |
| 2,465,875 | Hopkins | Mar. 29, 1949 |

FOREIGN PATENTS

| 7,034 | Great Britain | June 2, 1899 |
| 115,261 | Great Britain | Apr. 30, 1918 |